United States Patent [19]
Korycan

[11] Patent Number: 5,950,139
[45] Date of Patent: Sep. 7, 1999

[54] RADIOTELEPHONE WITH USER PERCEIVABLE VISUAL SIGNAL QUALITY INDICATOR

[75] Inventor: George M. Korycan, Union, Ill.

[73] Assignee: Motorola, Inc., Schaumburg, Ill.

[21] Appl. No.: 08/961,170

[22] Filed: Oct. 30, 1997

[51] Int. Cl.[6] .................................................. H04B 17/00
[52] U.S. Cl. .................. 455/566; 455/226.2; 455/226.3; 455/226.4
[58] Field of Search .............................. 455/226.2, 226.3, 455/226.4, 566, 575, 90, 403, 550; D14/137, 138; 345/33, 39, 44, 169, 901

[56] References Cited

U.S. PATENT DOCUMENTS

| | | | |
|---|---|---|---|
| 4,823,311 | 4/1989 | Hunter et al. | 708/144 |
| 5,239,684 | 8/1993 | Ishikura | 455/67.7 |
| 5,327,457 | 7/1994 | Leopold | 375/10 |
| 5,523,766 | 6/1996 | Erceg | 343/702 |
| 5,630,210 | 5/1997 | Marry et al. | 455/67.3 |
| 5,668,554 | 9/1997 | Orr et al. | 342/20 |

FOREIGN PATENT DOCUMENTS 0 652 646 A1  11/1993  European Pat. Off. .
0 611 199 A1   8/1994  European Pat. Off. .

*Primary Examiner*—William G. Trost
*Assistant Examiner*—Sonny Trinh
*Attorney, Agent, or Firm*—Daniel W. Juffenbruch; Rolland R. Hackbart

[57] ABSTRACT

A portable radiotelephone (100) has a signal quality indicator (110) disposed in a location on an outer surface of a housing thereof so that the indicator is within a peripheral view of the user when an earpiece (210) of the radiotelephone is held to a user's ear. In the peripheral vision of the user, the signal quality indicator (110) indicates a quality of the signal received by receiver (130) of the portable radiotelephone handset.

23 Claims, 5 Drawing Sheets

RADIOTELEPHONE WITH USER PERCEIVABLE VISUAL SIGNAL QUALITY INDICATOR

BACKGROUND OF THE INVENTION

1. Technical Field of the Invention

The present invention relates to radio receivers and, more particularly, relates to portable radios having signal quality indicators within a peripheral vision of a user.

2. Description of the Related Art

Signal strength indicators are well-known on radios. Cellular radiotelephones have utilized light emitting diode (LED) and liquid crystal display (LCD) bar graph displays to indicate signal quality levels such as signal-to-noise ratio, signal strength and bit error rates. Before dialing to set up a telephone call, a user of a cellular radiotelephone could check the signal quality on the display. Thereafter, the user would hold the portable radio handset to the user's ear during a conversation. While the portable radiotelephone is held to a user's ear, the user is unable to visually perceive the signal quality.

Portable satellite radiotelephones have antennas that are more directional than terrestrial cellular radiotelephones. The antenna in a satellite radiotelephone handset should be held in a substantially vertical orientation for communication with satellites overhead. Should the user of a portable satellite radiotelephone handset move the antenna away from a substantially vertical orientation, the signal quality will diminish, but the user may not understand what is occurring. In digital cellular radio, the signal quality is not as audibly perceivable than is in older analog radio. A mechanism for providing user perceivable visual feedback is needed.

DETAILED DESCRIPTION OF THE PREFERRED EMBODIMENTS

Figure 1:
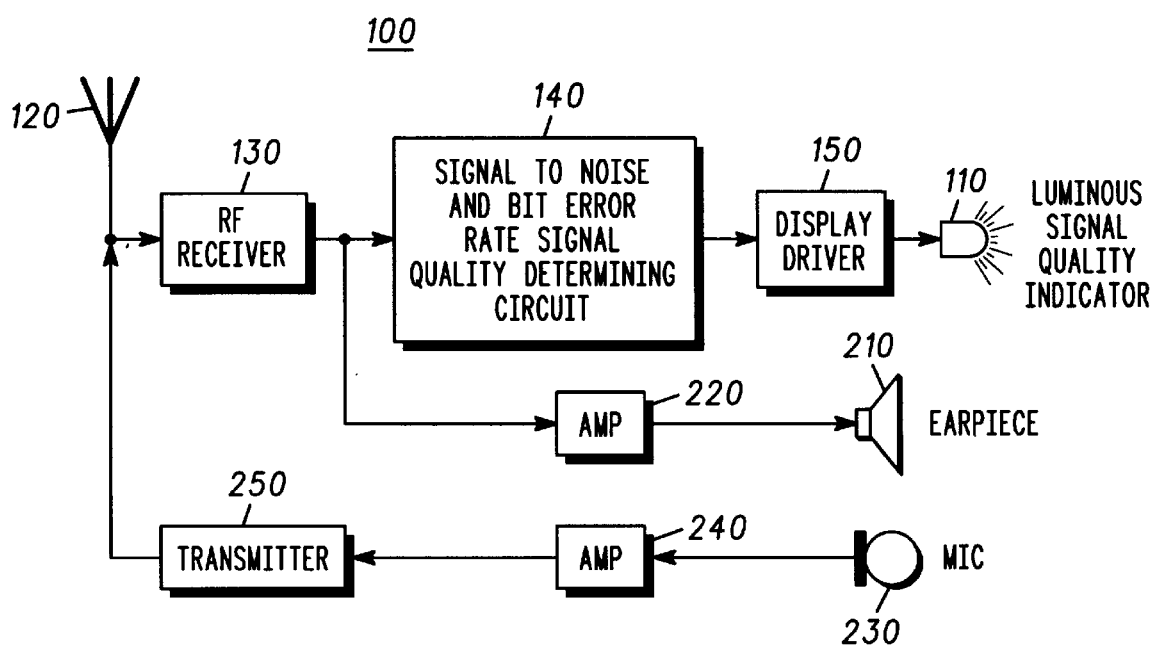
FIG. 1 illustrates a schematic block diagram of a radiotelephone.

FIG. 1 illustrates a schematic block diagram of a portable radiotelephone 100 having a luminous signal quality indicator 110. The luminous signal quality indicator 110 is located on a housing of the radiotelephone 100 within the user's peripheral vision so that the user can receive visual signal quality feedback during a telephone call. In a satellite radiotelephone receiver, for example, the antenna 120 is directional and operates best in a substantially vertical orientation. When the antenna 120 is not at a substantially vertical orientation, the RF receiver 130 will receive a radio signal of less signal strength than when the antenna 120 is in a substantially vertical orientation.

A signal quality determining circuit 140 receives the received radio signal from the RF receiver 130. When the antenna 120 is not oriented substantially vertically, the signal-to-noise ratio, signal strength and/or the bit error rate of the signal from the RF receiver 130 will diminish. The signal quality determining circuit 140 measures the signal-to-noise ratio, the bit error rate and signal strength for display on a display driver 150. Based on one or combinations of the signal-to-noise ratio, the bit error rate and the signal strength, the display driver drives the luminous signal quality indicator 110.

The radiotelephone also has an earpiece 210 driven by an amplifier 220 based on an output of the RF receiver 130. A microphone 230 transmits the user's voice via an amplifier 240 and transmitter 250 to the antenna 120.

Figure 2:
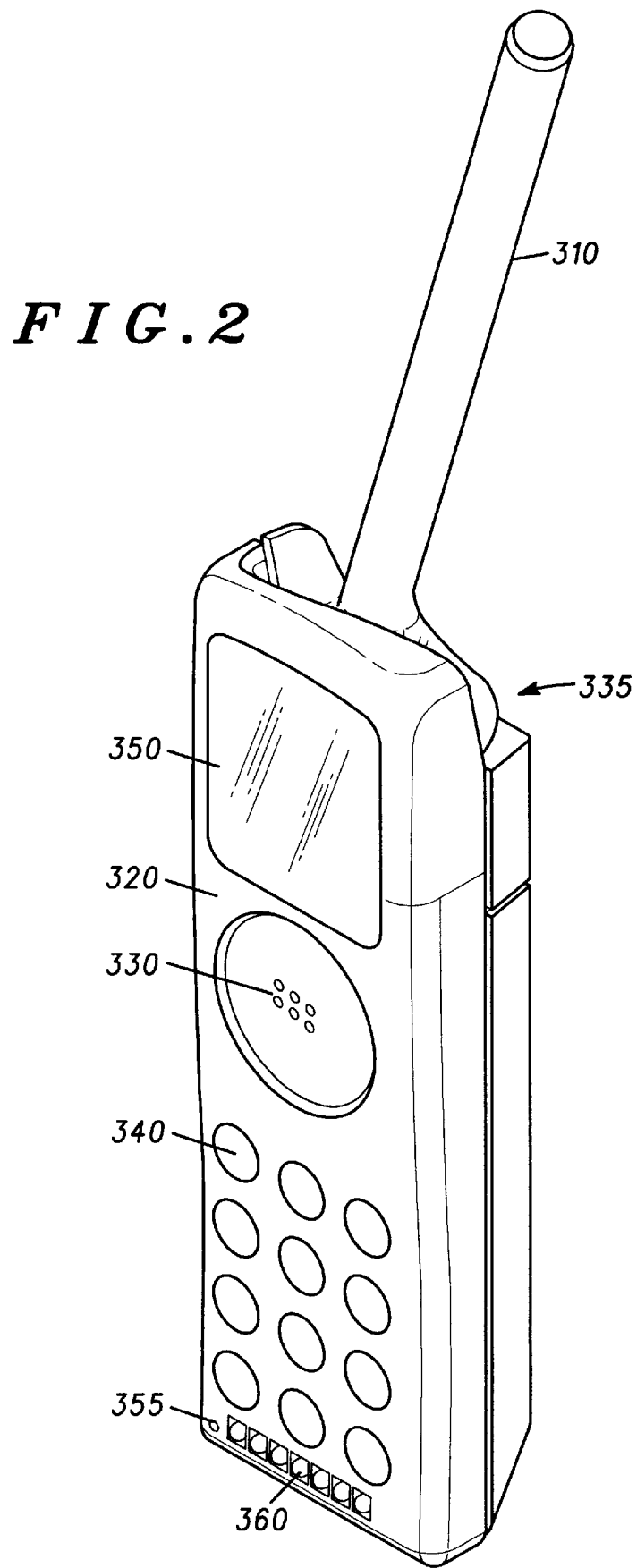
FIGS. 2–5 illustrate alternate locations for a signal quality indicator, according to respective first, second, third and fourth embodiments.

FIG. 2 illustrates a front, top, side perspective view of the radiotelephone according to a first embodiment. An antenna 310 is pivotably mounted to a housing 320 of the radiotelephone at a pivot point 335 on the back of the radiotelephone. An earpiece 330, a keyboard 340 and a display 350 are on a front of a radiotelephone. The keyboard 340 provides for dialing of telephone numbers and other conventional operations. The display 350 provides for display of these telephone numbers and other conventional information. A microphone 355 is provided near the bottom of the front surface of the radiotelephone.

A signal quality indicator 360 is provided on the front surface near a bottom edge of the radiotelephone according to the first embodiment illustrated in FIG. 2. By providing the signal quality indicator near a bottom edge rather than in the center of the display 350, the signal quality indicator is more readily perceived by the user because it is within the user's peripheral vision when the telephone earpiece 330 is held to the user's head during a telephone call.

The signal quality indicator 360 in the first embodiment of FIG. 2 is preferably made up of a plurality of light emitting diodes (LEDs) of green, yellow and red. One or more green LEDs are illuminated when the signal quality is best. As the signal quality diminishes, one or more yellow LEDs are illuminated, and when the signal quality is at its worst, one or more red LEDs are illuminated. Alternatively, a single color of all red could be used. The color change from green to yellow to red for diminishing signal quality is believed to be intuitive to a user of the radiotelephone and thereby preferred. The lower the signal quality, the greater the number of red LEDs would be illuminated. In another alternative, a single light such as the luminous signal quality indicator 110 of FIG. 1 could be implemented as a single LED. The single LED could emit three different colors: green, yellow or red. Further, the LED could increase its brightness in the red region as the quality diminishes further. Alternatively, the single LED could be red at all times and get brighter and brightest as the signal quality goes from worse to worst and the LED goes from bright red to brightest red. Displays other than LED displays are also possible. For instance, the light could be from a light bulb or laser diode.

It is believed that a luminous display is easier for a user to perceive in the user's peripheral vision than a non-luminous display. This is because a luminous display emits light. The luminous display will be useful in different environments and ambient light conditions, and is believed to also be easier to detect in a given ambient light condition than a reflective display, such as that of an LCD. Nevertheless, LCDs or reflective elements such as rotation of a meter needle, possibly having different colors thereon are possible, but less preferred.

Besides using color or intensity, the signal quality indicator could alternatively be driven by the display driver 150 to pulse at a faster rate as the signal quality diminishes. The flashing could be used to control the intensity of the LED at very high flash rates. Or a slower flash rate perceivable to the user could be used to communicate a particular condition of the signal quality. The display driver 150 causes the signal quality indicator to be disabled and not indicate a signal quality when the radiotelephone is on in a standby mode but not in a telephone call.

Figure 3:
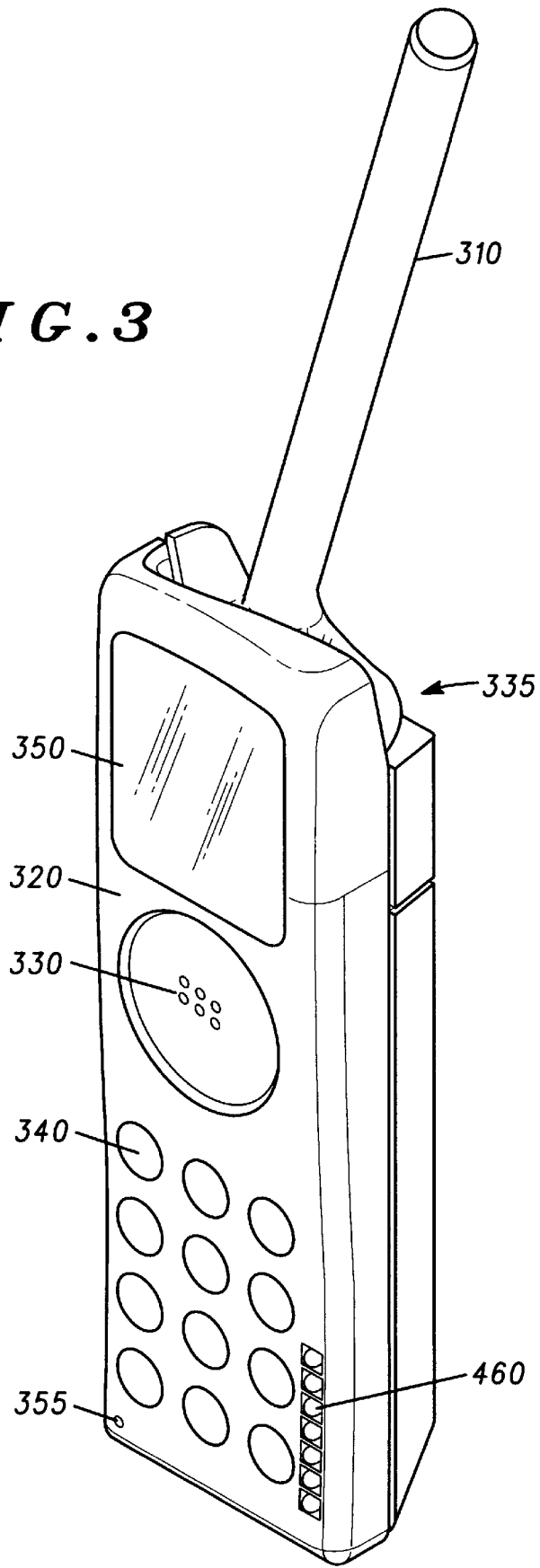

FIG. 3 illustrates a front, top, side perspective view of the radiotelephone according to the second embodiment. A signal quality indicator 460 is provided on the front surface near a side edge of the radiotelephone as an alternate embodiment to the bottom edge of FIG. 2. The side edge placement of the signal quality indicator 460 in the second embodiment is believed to be more clearly within the peripheral vision of the user holding the phone in the left hand, but less clearly for a user holding the phone in the right hand. The signal quality indicator 460 could also be placed on the side near the edge rather than the illustrated front near the edge. When the antenna 310 is capable of pivoting about axis 335 for both right-handed and left-handed users, this alternate second embodiment is less desirable than the first embodiment.

Figure 4:
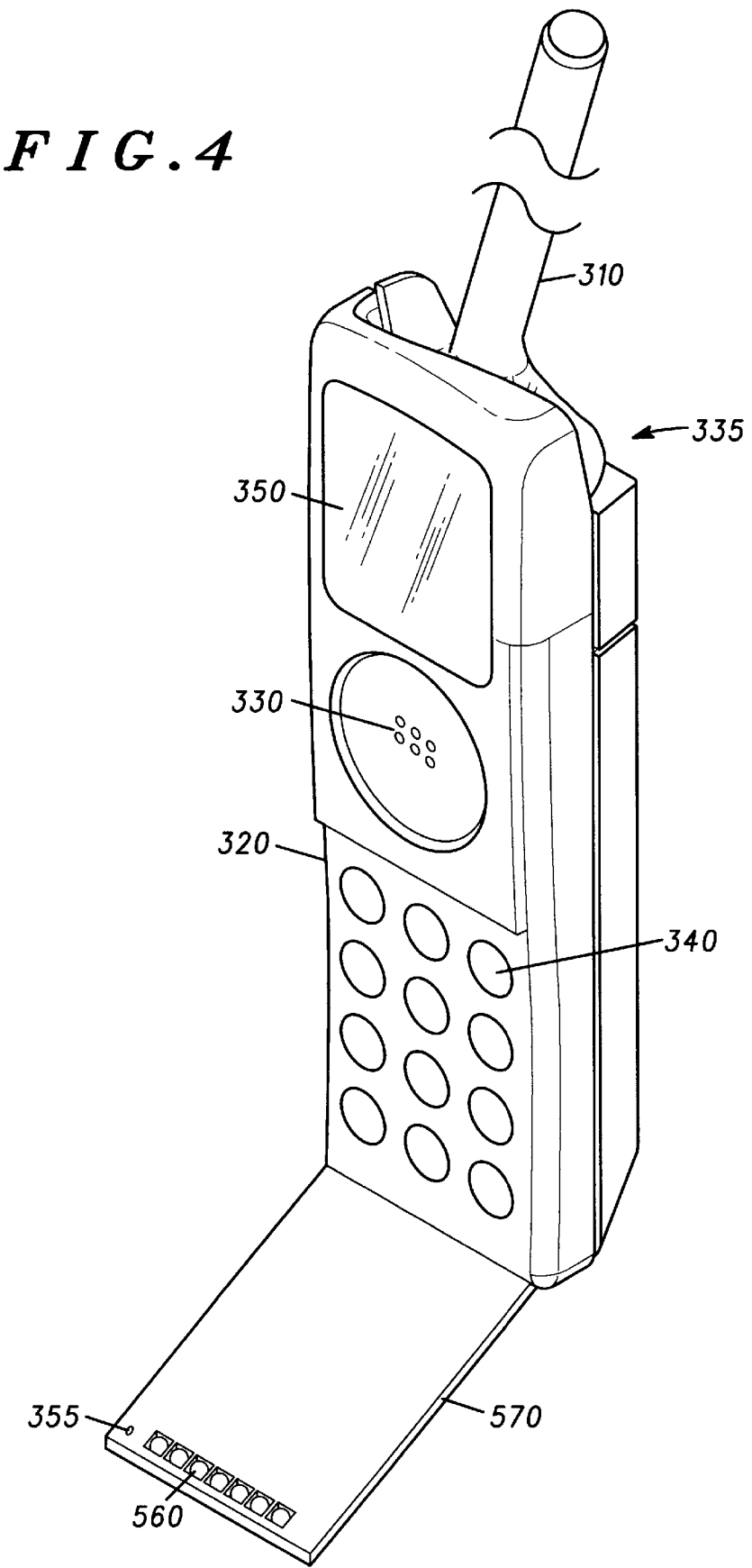
Figure 5:
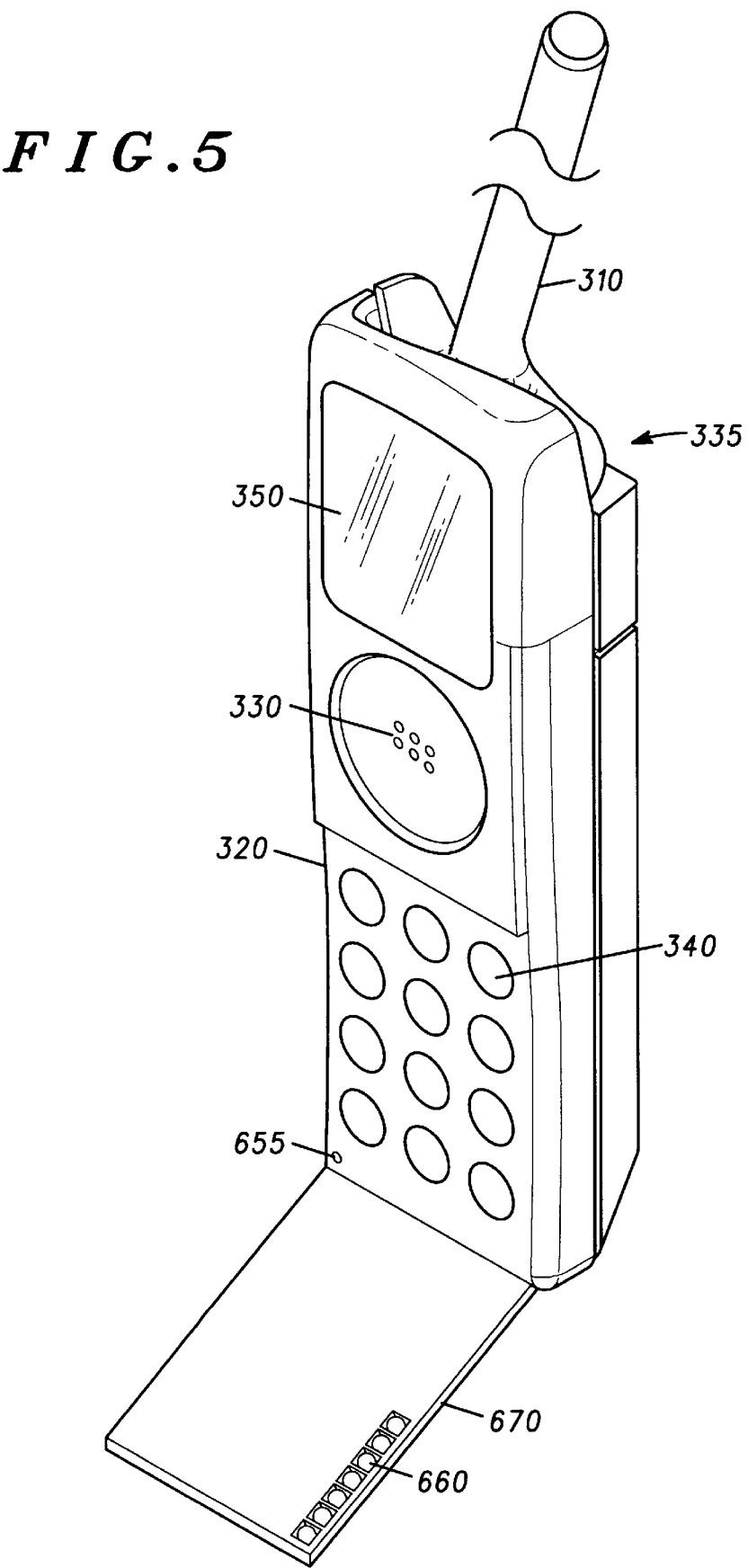

FIGS. 4 and 5 illustrate a front, top, side perspective view of the radiotelephone according to third and fourth embodiments, respectively. A hinged flap, or substrate 570, 670, hinged at a front bottom edge of the housing 320 of the radiotelephone. A microphone 555 is placed on the substrate 570, as in FIG. 4, or a microphone 655 is placed in the housing 320 rather than the flap 670. This substrate, as illusterated, is a keyboard cover for the keyboard 340, but in an alternate construction could be one-portion of a folding "clamshell" type cellular telephone. In either application, the signal quality indicator would be disposed in the second substrate for better viewing within the peripheral vision of the user.

Although the invention has been described and illustrated in the above description and drawings, it is understood that this description is by example only and that numerous changes and modifications can be made by those skilled in the art without departing from the true spirit and scope of the invention. For example, the signal quality indicator could indicate a position of the antenna by responding to a mercury switch or the like. Although the antenna structure realizes a compact portable radiotelephone handset, the antenna structure could be utilized with other types of radios such as pagers, for example.

What is claimed is:

1. A portable radiotelephone, comprising:
   a receiver for receiving a radio signal;
   a signal quality determining circuit operatively coupled to the receiver for determining a signal quality of the radio signal received by the receiver;
   a display driver operatively coupled to the signal quality determining circuit for providing a display signal based on the signal quality;
   a telephone earpiece operatively coupled to produce audible sound based on the radio signal received by the receiver;
   a radiotelephone housing for housing the receiver and the telephone earpiece and adapted to be held to a users head with the earpiece adjacent to an ear of the user; and
   a signal quality indicator disposed on an outer surface of the radiotelephone housing within the peripheral vision of the user when the telephone earpiece is held to a users head with the earpiece adjacent to an ear of the user and operatively coupled to receive the display signal from the display driver.

2. A portable radiotelephone according to claim 1, wherein the signal quality determining circuit assesses the signal strength of the radio signal.

3. A portable radiotelephone according to claim 1, wherein the signal quality determining circuit assesses at least the bit error rate of the radio signal.

4. A portable radiotelephone according to claim 1, wherein the signal quality indicator is positioned on a side of the outer surface of the radiotelephone within the peripheral vision of the user.

5. A portable radiotelephone according to claim 1, wherein the signal quality indicator is positioned near a bottom edge of the outer surface of the radiotelephone within the peripheral vision of the user.

6. A portable radiotelephone according to claim 1,
   wherein the radiotelephone housing comprises a first substrate containing the telephone earpiece and a second substrate hinged to the first substrate; and
   wherein signal quality indicator is positioned on a surface of the second substrate within the peripheral vision of the user when the second substrate is hinged open relative to the first substrate.

7. A portable radiotelephone according to claim 6, wherein the signal quality indicator is positioned on a side edge of the second substrate within the peripheral vision of the user when the second substrate is hinged open relative to the first substrate.

8. A portable radiotelephone according to claim 6, wherein the signal quality indicator is positioned on a bottom edge of the second substrate within the peripheral vision of the user when the second substrate is hinged open relative to the first substrate.

9. A portable radiotelephone according to claim 1, wherein a magnitude of the signal quality indicator increases as the signal quality diminishes.

10. A portable radiotelephone according to claim 9, wherein a brightness of the signal quality indicator increases as the signal quality diminishes.

11. A portable radiotelephone according to claim 1, wherein the signal quality indicator comprises a plurality of indicator lights.

12. A portable radiotelephone according to claim 11, wherein an illuminated number of the plurality of indicator lights increases as the signal quality diminishes.

13. A portable radiotelephone according to claim 11, wherein the plurality of indicator lights of the signal quality indicator has at least two colors.

14. A portable radiotelephone according to claim 13, wherein the colors of the plurality of indicator lights include green and red.

15. A portable radiotelephone according to claim 1, wherein a color of the signal quality indicator changes as the signal quality diminishes.

16. A portable radiotelephone according to claim 15, wherein the color of the signal quality indicator changes by starting at green for the best signal quality and ends at red for the worst signal quality.

17. A portable radiotelephone according to claim 1, further comprising an antenna requiring a substantially vertical orientation during radio reception.

18. A portable radiotelephone according to claim 1, wherein the antenna is rotatably coupled to the radiotelephone housing.

19. A portable radiotelephone according to claim 1, wherein the signal quality indicator comprises a luminous indicator which emits light.

20. A portable radiotelephone according to claim 1, wherein the display driver causes the signal quality indicator to flash at a rate dependent on the signal quality.

21. A portable radiotelephone according to claim 1, wherein the display driver causes the signal quality indicator to not indicate a signal quality when the radiotelephone is on in a standby mode but not in a telephone call.

22. A portable radio device, comprising:
    a receiver for receiving a radio signal;

a signal quality determining circuit operatively coupled to the receiver for determining a signal quality of the radio signal received by the receiver;

a display driver operatively coupled to the signal quality determining circuit for providing a display signal based on the signal quality;

an earpiece operatively coupled to produce audible sound based on the radio signal received by the receiver; and a signal quality indicator disposed within the peripheral vision of the user when the portable radio is in use and operatively coupled to receive the display signal from the display driver, wherein a color of the signal quality indicator changes as the signal quality diminishes.

23. A portable radiotelephone according to claim 22, wherein the color of the signal quality indicator changes by starting at green for the best signal quality and ends at red for the worst signal quality.

* * * * *